H. F. JOEL.
SECONDARY BATTERY.
APPLICATION FILED AUG. 10, 1907.
910,822.
Patented Jan. 26, 1909.
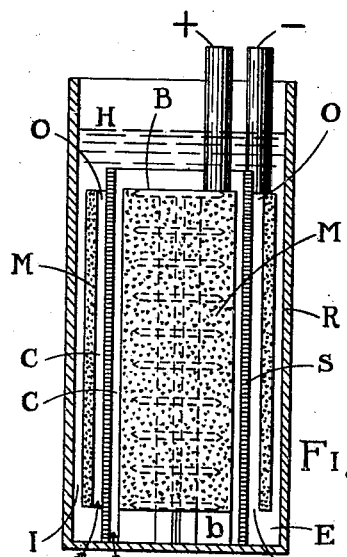
Fig. 1.
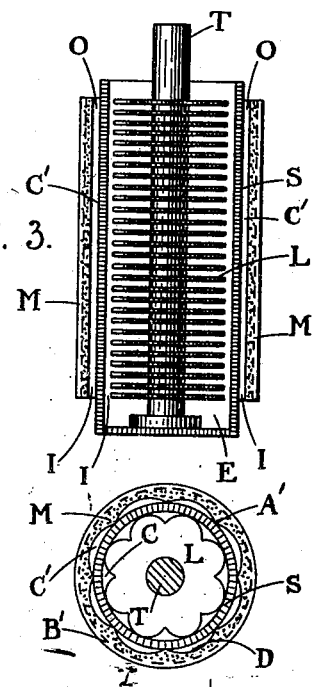
Fig. 3.
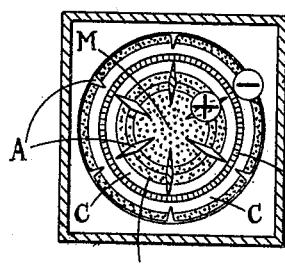
Fig. 2.
Fig. 4.
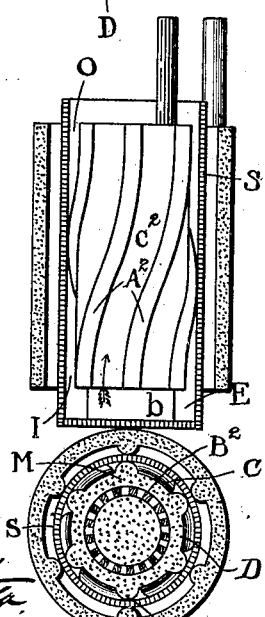
Fig. 5.
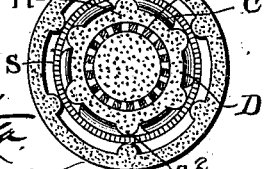
Fig. 6.
Witnesses
Inventor
H. F. Joel
by Wilkinson Fisher
his Attorneys

UNITED STATES PATENT OFFICE.

HENRY FRANCIS JOEL, OF FOREST GATE, ENGLAND.

SECONDARY BATTERY.

No. 910,822.  Specification of Letters Patent.  Patented Jan. 26, 1909.

Application filed August 10, 1907. Serial No. 387,993.

*To all whom it may concern:*

Be it known that I, HENRY FRANCIS JOEL, a subject of the King of England, residing at Forest Gate, in the county of Essex, England, have invented certain new and useful Improvements in Secondary Batteries, of which the following is a specification.

This invention relates to improvements in secondary batteries in which cylindrical electrodes operate in conjunction either with each other direct, or through an interposed porous septum; and the object of the improvement is to produce spaces, channels, or ducts, between the electrodes, or between the electrodes and the septum, which are open both at their bottom and top ends, for the access and circulation of the electrolyte and for the expansion of the electrodes.

This object is attained by the apparatus illustrated in the accompanying drawing, in which:

Figure 1, is a sectional elevation of a complete cell having cylindrical electrodes with projecting grid bars and a porous septum. Fig. 2 is a horizontal section of Fig. 1. Fig. 3, is a sectional elevation of a positive electrode of the Planté type surrounded as before by a septum and a negative electrode. Fig. 4, is a horizontal section of Fig. 3. Fig. 5, is a view partly in section showing a positive electrode with helical ridges and Fig. 6, is a horizontal section of Fig. 5.

Similar letters refer to similar parts throughout the several views.

Referring to Figs. 1 and 2, the electrodes are cylindrical grids, the inner one marked B, having vertical projecting ribs A which project beyond the active material M (indicated by the dotted area) and loosely fit against the cylindrical septum S, which divides them; active material is pasted on to the grids but its surface D is kept beneath that of the projecting ribs A so that channels C, C, are formed; these are open both at the top to the general body of the electrolyte and at the bottom to the space E. An outer case R contains the electrodes, positive and negative, the porous separating tube S, and the electrolyte, the surface of which is shown at H.

The sectional elevation of the grid B, is shown in dotted lines Fig. 1. The lower part $b$ of the vertical ribs of B are left uncovered, to serve as a support for the electrode, and also to provide the space E, for the access of the electrolyte to the bottom inlets I, I, of the channels C, C. The grid B is arranged to fit easily inside the porous tube S, and the electrode may be removed at any time. If any of the ridges A do not touch the porous tube the channels adjoining such ridges become connected and even if all the channels on the surfaces of the electrodes are so connected they become a continuous inclosed channel between the electrodes and the porous tube, or between the pairs of electrodes, concentric and annular in form which serves a similar purpose to the divided surface channels. The ribs A, of the grid B, also serve to centralize the electrodes and keep them in position on the inside and on the outside of the porous tube.

In the foregoing described cell the action of the electric current decomposes the electrolyte between the electrodes in the inclosed ducts C, C, and as it is decomposed it is replaced by fresh electrolyte from the bottom of the cell at E. The gas evolved accumulates towards the upper ends of the ducts C, C and escapes through the outlets O, O. The gas in rising induces an upward flow in the electrolyte from the bottom of the cell at E, where the liquid is usually most dense, through the inlets I, I, as indicated by the arrows, and ducts C, C, to the upper part of the cell, where the electrolyte is less dense, and thus it (the gas) assists in setting up an auxiliary automatic circulation tending to equalize the electrolyte throughout the cell with advantage to the efficiency and output.

I may modify the construction of the cylindrical form of grid B, shown in Figs. 1 and 2 and make vertical ribs to radiate from a central rod, filling in the spaces between these radiating ribs with active material molded to form recesses and channels in combination with the porous septum as described.

Figs. 3 and 4 show a cell having a positive electrode of the Planté type, the disks L being preferably cut out of the solid along with the central supporting rod T; the edges of the disks L are provided with alternate ridges and recesses one above the other so as to form vertical channels longitudinally of the electrode. The disks have spaces between them for the formation, or pasting, of the active material on the surface of the plate as is well understood. The channels formed by the ridges and recesses in combination with the porous septum S provide room for the expansion of the active material and for the circulation of the electrolyte. The outer electrode B' may be formed either with pasted active material or of Planté ribbed plating having the active material deposited thereon by electrolysis; in either case it will be formed with alternate longitudinal ridges A' and recesses C' corresponding to those on the inner electrode.

Figs. 5 and 6 show a cylindrical form of tubular grid $B^2$ placed in the center of the electrode and completely surrounded by the active material M which is molded while in a plastic state to form the projecting ridges $A^2$ and channels $C^2$. The ridges A may be either vertical, or they may be formed spirally around the electrode, the latter being a convenient form to manufacture by twisting while passing through a die. The same construction is applicable to the outside electrode if desired. The inner electrode is surrounded as shown by the porous tube S, and the outside electrode may be either of the Planté ribbed plating, or of active material on a cylindrical grid, with projections on the active material which form channels between it and the porous tube S.

I have referred to ribs or ridges but it will be readily understood that these ridges need not necessarily be continuous. For example they may be broken up into a series of projections or points without any great detriment to the action of the battery.

It is to be noted that while the electrodes and porous septa are combined for mutual support and action the electrodes can be independently formed, and the spaces provided for expansion allow of these being removed from the porous chambers if required.

I do not wish to be understood as limiting myself to porous septa, however, for it is evident I may employ any suitable form of separator.

What I claim as my invention and desire to secure by Letters Patent is:—

1. The combination in a secondary battery, of cylindrical electrodes one disposed concentrically around the other, a series approximately vertical outwardly projecting ribs on the inner electrode, a series of corresponding ribs on the outer electrode, a cylindrical separator interposed between the electrodes so that approximately vertical channels are formed on either side thereof, active material on the electrodes, and an electrolyte all substantially as and for the purpose set forth.

2. In a secondary battery and in combination, a cylindrical positive grid having vertical ribs projecting radially therefrom, a cylindrical negative grid concentrically disposed around the positive grid and having inwardly projecting vertical ribs, a porous cylindrical septum interposed between the grids, active material pasted on both grids, whose surface level is beneath that of the projecting ribs so that vertical channels are formed on either side of the septum with openings at the bottom and at the top, and an electrolyte, substantially as described herein.

In testimony whereof I have affixed my signature in presence of two witnesses.

HENRY FRANCIS JOEL.

Witnesses:
 SYDNEY ELLIOTT PAGE,
 ARTHUR GUMMER.